Aug. 22, 1939.　　　P. F. SHIVERS　　　2,170,310
CONTROLLER FOR HEATING SYSTEMS
Original Filed April 11, 1932
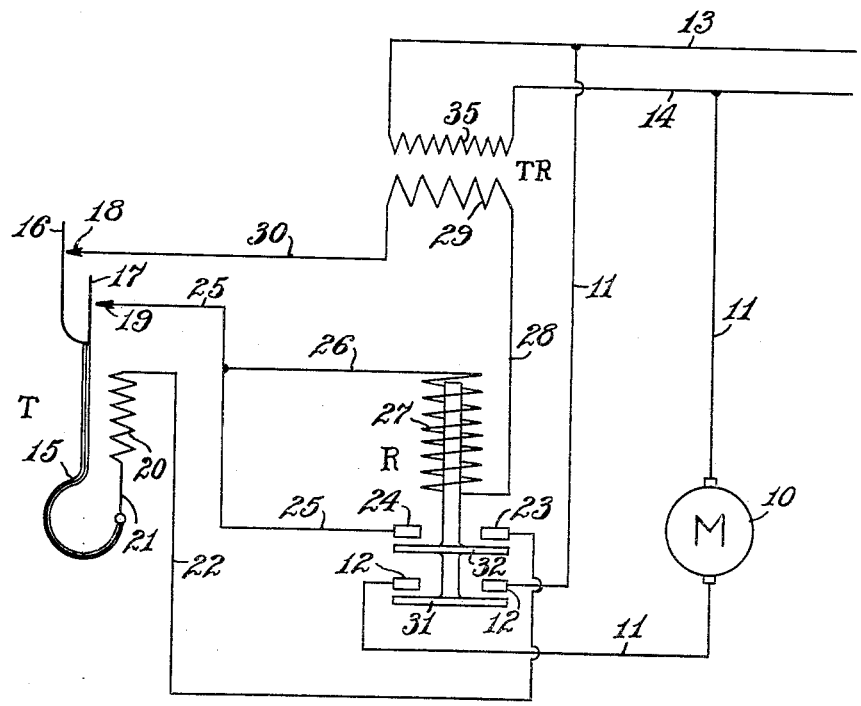
INVENTOR.
Paul F. Shivers,
BY
Hood + Hahn.
ATTORNEYS Patented Aug. 22, 1939

2,170,310

UNITED STATES PATENT OFFICE 2,170,310

CONTROLLER FOR HEATING SYSTEMS

Paul F. Shivers, Wabash, Ind., assignor to Minneapolis-Honeywell Regulator Company, Minneapolis, Minn., a corporation of Delaware Application April 11, 1932, Serial No. 604,637
Renewed June 27, 1934

22 Claims. (Cl. 236—68)

Many heating plants, particularly those designed for the consumption of solid fuel such as coal, have heretofore been equipped with automatic damper-manipulating mechanism responsive to variations in temperature conditions in one or more of the rooms to be heated, as determined by the response of a thermostatic element situated in such room. In such devices, however, stimulation of the heater continues until the desired temperature response is made by said thermostatic element, and this response does not occur until the room, in the close vicinity of the thermostat, has acquired a predetermined temperature and, as a consequence, room temperature is likely to continue to rise, due to the previous stimulation of the heater, higher than need be.

It has therefore been heretofore proposed to provide means for locally heating the temperature-responsive element (in addition to the heating thereof by the ambient medium heated by the main heater) to cause the thermostatic element to respond toward its non-stimulating "hot" position in advance of the time when it would respond as a result of main heater stimulation, so that the final desired rise in temperature in a heated room will be the result of main heater action subsequent to discontinuance of its stimulation. Such devices, so far as I am aware, have been of such character that the supplemental local heating of the thermally-responsive element is initiated concurrently with the initiation of a heater-stimulation period, and consequently there are certain undesirable inaccuracies of, or lags in, control.

The object of my present invention is to provide a control device wherein the initial response of the controlling thermostatic element to rise in temperature of its ambient medium, but insufficient to cause discontinuance of heater stimulation, will initiate local stimulation of the controlling temperature-responsive element to cause a response of said thermally-responsive element such as to cause discontinuance of heater stimulation, in advance of the time when such heater stimulation would otherwise be discontinued as a result of the response of the thermally-responsive element to temperature rise caused solely as a result of stimulation of the primary heater. More specifically, my improvement involves local heat stimulation of the thermally-responsive controlling element toward its "hot" position, which local heating is initiated as a result of initial response of the thermally-responsive element toward "hot" position to heat conditions produced by the primary heater.

By "heater stimulation" I mean an increase of capacity of heat delivery to the space in which the controlling thermally-responsive element is placed. It will be readily understood that a large variety of mechanisms may be provided for accomplishing such heater stimulation, all of which, so far as I am now aware, I believe to be within the scope of my present invention. For instance, if the heater is an ordinary coal-burning furnace, heater stimulation may be attained by forced draft means, which forced draft may be the result of a blast produced by a fan driven by a suitable motor, the motor being started at the time of desired heater stimulation or valve mechanism provided for opening communication between the fan and furnace. In the case of an oil-burning furnace, so constructed as to have a considerable carry-over heating value after cessation of fuel delivery, heater stimulation would be accomplished by initiating fuel delivery. Or, in the case of a constantly energized heater, either of the warm air type or circulating fluid type, heater stimulation may be attained by means to accomplish forced circulation of the heating fluid, or by opening communication between the heater and the heat delivery element such as a register or radiator in the room in which the thermally-responsive controlling element is positioned.

The accompanying drawing illustrates my invention diagrammatically.

In the drawing 10 indicates an electric motor connected by wires 11 through the switch points 12, 12 with suitable supply lines 13 and 14. This motor will be referred to as the control motor, and is the element which directly determines heater stimulation. For a coal-burning furnace it may be either a motor suitable for driving a blast fan or a motor having a definite cycle suitable for manipulating draft dampers through one-half their cycle, said dampers being normally biased through the other half of their cycle so as to automatically return to normal non-heater-stimulating position when the control motor is deenergized.

The thermally-responsive controller T is of a well-known holding-circuit type comprising a thermally-responsive bimetallic blade 15 having contact-making terminal portions 16 and 17, with the portion 16 sufficiently flexible. Arranged to be contacted by terminals 16 and 17, respectively, are the fixed terminals 18 and 19 so adjusted that, as blade 15, responding to a drop in temperature of its ambient medium, moves toward its "cold" position, terminal 16 will first contact with its terminal 18, and upon further drop in temperature, terminal 17 will contact with its terminal 18. In practice the temperature differential of the two terminals 16 and 17 is about two degrees.

Arranged closely adjacent blade 15 (conveniently actually mounted upon said blade), so as to be capable of locally heating blade 15, is an electric heating coil 20, one end of which is connected, by wire 21, with terminals 16 and 17 (conveniently through blade 15), and the other end of which is connected by wire 22 with a switch point 23. For convenience heater 20 will be hereafter referred to as a "supplemental heater". A companion switch point 24 is connected by wire 25 with terminal 19.

Connected to wire 25, between terminal 19 and switch point 24 is a wire 26 which leads to one end of the coil 27 of a relay R, the other end of said coil being connected by wire 28 with one end of the secondary 29 of a step-down transformer TR, the other end of said secondary being connected by wire 30 with terminal 18. Relay R comprises a switch element 31 adapted to bridge points 12, and a switch element 32 adapted to bridge points 23, 24, said elements 31 and 32 being so placed as to simultaneously either close or open their relative circuits.

The primary 35 of transformer TR is connected to the line wires 13 and 14.

Relay R is biased to circuit-open position.

The operation is as follows:

So long as the temperature of the ambient medium of thermostat T is at or above a predetermined point as a result of a delivery of heat by the primary heater, (or otherwise), the terminals 16 and 17 will be out of contact with their respective terminals 18 and 19; supplemental heater 20, relay R, and the control motor 10 will be deenergized; and the respective circuits comprising switch points 12—12 and 23—24 will be open.

When the temperature of the ambient medium of thermostat T drops to a predetermined point, say seventy degrees, terminal 16 will be brought into contact with its terminal 18, but no circuits will be closed by such contact. Upon further drop of temperature, say sixty-eight degrees, thereby assuring a good electrical contact between terminals 16 and 18, terminal 17 will be brought into contact with terminal 19, thereby completing a relay circuit 29, 28, 27, 26, 25, 19, 17, 16, 18, 30, 29, thereby energizing relay R to cause 31 to bridge 12, 12, thus establishing the control motor circuit 13, 11, 12, 31, 12, 11, 10, 11, 14, and causing 32 to bridge 23, 24, thereby causing the relay to establish a holding circuit for relay R as follows:

29, 28, 27, 26, 25, 24, 32, 23, 22, 20, 21, 15, 16, 18, 30, 29, but this circuit is, at this time, incapable of substantially energizing heater 20 because of an existing short circuit therearound as follows:

29, 30, 18, 16, 17, 19, 25, 26, 27, 28, 29.

As a result of the above-described establishment of the control motor circuit the main heater will be stimulated and heat will be delivered to the ambient medium of thermostat T. Ultimately blade 15, responding to the rise in temperature of its ambient medium, will move to the left so as to withdraw terminal 17 from terminal 19. Relay R will continue to be energized because of maintenance of its holding circuit at 16—18 and consequently control motor 10 will continue to be energized but the circuit break at 17—19 removes the short from the circuit of the supplemental heater 20 and said heater will be energized through the circuit 29, 28, 27, 26, 25, 24, 32, 23, 22, 20, 15, 16, 18, 30, 29. The supplemental heater 20 is so designed as to respond very quickly to promptly locally heat blade 15 enough to promptly cause it to withdraw its terminal 16 from terminal 18, such withdrawal occurring very considerably in advance of the time of such withdrawal under the influence of its slower response to rise in temperature of its ambient medium in response to delivery of heat from the main heater. As a consequence, relay R being deenergized as a result of the circuit break at 16—18, control motor 10 is deenergized considerably in advance of the time at which it would be normally deenergized as a result of response of blade 15 to rise in temperature of its ambient medium resulting from heat delivered from the main heater which has been stimulated by the control motor 10. The circuit break at 17—19 resulting from the local heating of blade 15 by supplemental heater 20 will, of course, deenergize said supplemental heater and blade 15 will start on a return to "cold" position to reestablish the contact 17—19.

It will be noticed that the supplemental heater 20 is not energized at the time when the control motor is first energized but, is energized only after blade 15 has sufficiently responded to a rise in temperature resulting from heater stimulation. If, as has heretofore been the usual practice, supplemental heater 20 were energized at the time of initiation of heater stimulation, the heat delivery capacity of the supplemental heater must be comparatively small so that the main heater stimulation may be carried on through a period of substantial duration, and as a consequence there is a lack of positiveness of circuit break, both as to time and character, under the influence of the supplemental heater, but, with the arrangement which I have described, the supplemental heater 20 may be so designed as to have a comparatively large heat delivery capacity so that blade 15 may be very quickly and positively affected thereby to quickly and positively withdraw its terminal 16 from terminal 18, thereby causing deenergization of control motor 10, but only after blade 15 has begun to respond to the effect of main heater stimulation.

The thermally-responsive blade 15 should be considered typical of an element movable in opposite directions in response to variations in conditions at a predetermined point and produced as a result of the energization or non-energization of the control motor, and the supplemental heater typical of power-developing means capable of causing movement of the blade, in the same direction as movement caused as a result of actuation of the control motor, and so coordinated with the blade that it will be made effective upon the blade only after the blade has begun to respond, at one end of its movement, in a reverse direction as a result of the energization of the control motor, or of means to cause separation of terminals 16—18.

The elements 15, 16, 18, 30, 29, 28, 27, 26, 25, 24, 32, 23, 22, 20, 21 form an electric timing device which permits maintenance of motor operation for only a predetermined time interval subsequent to motor circuit break at 17—19.

I claim as my invention:

1. A controller comprising, a control motor, an energizing circuit therefor including a switch, a singly thermally-responsive element, a supplemental heater arranged to locally heat said thermally-responsive element, means controlled by the thermally-responsive element for establishing the energizing circuit of the control motor by movement of the thermally-responsive element in one direction and means controlled by initial reverse movement of the thermally-responsive element for energizing the supplemental heater to cause further reverse movement of the thermally-responsive element to break the energizing circuit of the control motor.

2. A controller comprising, a control motor, a single reciprocating element movable in opposite directions in response to variations in conditions at a predetermined point, an energizing circuit for said motor controlled by said reciprocatory element, a supplemental activator for said reciprocatory element effective thereon to move the same in a direction opposite to that which will cause energization of the motor, and means, controlled by the reciprocatory element at the initial end of its said opposite movement in response to reversal of conditions at said predetermined point, to render said supplemental activator effective upon said reciprocatory element to drive it to a position to deactivate the control motor.

3. A controller comprising a control motor, an energizing circuit for said motor including a switch biased to open position, a single thermostatic blade, two terminals carried by said blade, two coacting terminals one for each of said first-mentioned terminals, an electric heater arranged to locally heat said blade to cause movement of its terminals away from the companion terminals, a relay embodying a coil and means for actuating said switch to closed position, an energizing circuit for said relay including the relay coil, the two blade-carried terminals and their companion terminals, and electrical connections, and electrical connections embodying said heater, one of the blade-carried terminals and its companion terminal for causing energization of said heater following initiation of reverse movement of the blade from motor-energizing position.

4. A controller comprising a reciprocatory element, two pairs of terminals with one terminal of each pair carried by said reciprocatory element and the several terminals so arranged and constructed that movement of said reciprocatory element in one direction will establish contact of one terminal pair in advance of contact of the other pair and movement of said element in the opposite direction from contacting position will break contact of said other pair in advance of contact break of said one pair, an electrical device having an energizing circuit embodying both said pairs of terminals, means for causing movement of said reciprocatory element in terminal-separating direction, means controlled by said electrical device for energizing said first-mentioned means following contacting of both said pairs of terminals and subsequent separation of the first-separating terminal pair, and means causing deenergization of said first-mentioned means upon separation of the second-separating pair of terminals.

5. A controller comprising a reciprocatory element movable in opposite directions in response to variations in conditions at a predetermined point, two pairs of terminals with one terminal of each pair carried by said reciprocatory element and the several terminals so arranged and constructed that movement of said reciprocatory element in one direction will establish contact of one terminal pair in advance of contact of the other pair and movement of said element in the opposite direction from contacting position will break contact of said other pair in advance of contact break of said one terminal pair, a supplemental activator arranged when activated to cause said reciprocatory element to move to break contact of said one terminal pair, and circuit connections embodying said two pairs of terminals whereby said supplemental activator will be energized following contact of both said pairs of terminals and subsequent separation of the first-separating terminal pair and deenergized upon separation of the second-separating terminal pair.

6. A control system comprising, a thermostatic element, two switches sequentially moved to closed position thereby as a result of a lowering of the temperature to which said thermostatic element responds, an electromagnetic coil, a switch controlled by the electromagnetic coil, said switch moving to closed circuit position upon energization of said electromagnetic coil, an electric heater arranged to locally heat said thermostatic element, an energizing circuit for the electromagnetic coil controlled by that one of the switches controlled by the thermostatic element which is last to close upon temperature fall, and a holding circuit for the electromagnetic coil including the other of the thermostatic element controlled switches, the electric heater and the electromagnetic coil controlled switch, said energizing circuit acting to shunt the electric heater as long as said energizing circuit is completed.

7. A control system comprising, a control element responsive to variations in a physical condition, two sets of contacts sequentially closed thereby as a result of a change in one direction of the physical condition to which the control element responds, an electromagnetic coil, a switch moved to closed position as a result of energization of said electromagnetic coil, an energizing circuit for the electromagnetic coil including the last-to-close set of contacts, a holding circuit for the electromagnetic coil including the first-to-close set of contacts and said switch, and an electrically-energized element connected in series in said holding circuit and arranged upon being energized to cause said control element to assume a position wherein both sets of contacts are open, the energizing circuit of said coil acting to shunt said electrically-energized element as long as the energizing circuit is completed.

8. A control system comprising, a control element responsive to variations in a physical condition and coordinated with two sets of contacts to sequentially close said contact sets upon a change in one direction of the physical condition to which said control element responds, a relay embodying a switch closed when the relay is energized, an energizing circuit for the relay including both sets of contacts, a holding circuit for the relay including the first-to-close set of contacts and said switch, and electrically-energized means arranged to open said holding circuit when energized, said means being operatively energized upon the opening of the last-to-close set of contacts following closure of both sets of contacts.

9. A controller comprising a control motor, a single reciprocatory element movable in opposite directions in response to variations in conditions at a predetermined point, an energizing circuit for said motor embodying a switch, an electrically-actuated means for controlling said switch and comprising an energizing circuit embodying a switch having one terminal carried by said reciprocating element, a supplemental activator arranged to cause discontinuance of the motor circuit, and means, activated by initial reverse movement of the reciprocating element from motor-activating position to render said supplemental activator active.

10. A control system comprising, an electric motor controlling the operation of a heat producing means, a control circuit for the motor, a thermostat comprising a single element responsive to a temperature condition produced as a result of motor operation and arranged to modify the control circuit upon a decrease in such temperature condition thereby to put the motor in operation to increase the heat output of the heat producing means, to the region of said thermostat and an electric timing device energized upon additional modification of said control circuit by said thermostat to maintain the motor in operation for a predetermined time interval following initiation of energization of said timing device.

11. A control system of the class described, comprising in combination, a condition-changing device, an electromagnetic coil in control thereof which renders said device operative only while the electromagnetic coil is energized, a condition-responsive device, a control switch controlled by said condition-responsive device, a circuit for said electromagnetic coil controlled by said control switch, a holding switch moved to closed position by said electromagnetic coil when energized, a holding circuit for said electromagnetic coil controlled by said holding switch and independent of said control switch, and electrical means to interrupt said holding circuit, said means including an electrical device which is shunted by said control switch so long as the same is closed.

12. A control system of the class described, comprising in combination, a temperature changing device, an electrical means in control thereof which renders said device operative only while the electrical means is energized, a temperature responsive device, a control switch controlled by said temperature responsive device, a circuit for said electrical means controlled by said control switch, a holding switch moved to closed position by said electrical means when energized, a holding circuit for said electrical means controlled by said holding switch and independent of said control switch, and electrical means to interrupt said holding circuit, said means including an electrical heater located in proximity to said temperature responsive device and which is shunted by said control switch so long as the same is closed.

13. A control system of the class described, comprising in combination, a temperature changing device, an electrical means in control thereof which renders said device operative only while the electrical means is energized, a control switch, a circuit for said electrical means controlled by said control switch, a holding switch, means to move said holding switch to closed position when said device is placed in operation, a temperature responsive switch, a holding circuit for said electrical means controlled by said holding switch and temperature responsive switch and independent of said control switch, and electrical means to hasten the opening of said temperature responsive switch to interrupt said holding circuit, said means including an electrical device which is shunted by said control switch so long as the same is closed.

14. A temperature control system of the class described, comprising, in combination, an electrically controlled main temperature changing device, a gradual acting temperature responsive control mechanism including a single temperature responsive element and a pair of switches operated independently at different temperatures without any overlap in their temperature ranges, a first of said switches dominating operation of said temperature changing device to produce a change in the temperature being controlled and the second of said switches controlling said device to stop such change in temperature, an electrically operated auxiliary temperature changer to locally affect said temperature responsive control mechanism, and means including circuit connections operative to change the effect of said auxiliary temperature changer only after said first switch has moved out of that position in which it rendered said main temperature changing device operative while continuing to hold said main temperature changing mechanism operative upon a first change in temperature at said control mechanism, said means and circuit connections further rendering said main temperature changing mechanism inoperative and changing the effect of said auxiliary temperature changer back to its initial condition upon operation of said second switch as a result of further temperature change at said control mechanism.

15. In a temperature control system, in combination, a main electrical temperature changing device for changing the temperature of a space while energized, a gradual acting temperature controller including a single temperature responsive element and first and second switches that close in such sequence upon temperature change in a first direction and open in the reverse sequence upon temperature change in a second direction, an auxiliary electric temperature changer for locally affecting said temperature controller, and means including electrical connections for energizing the main temperature changing device upon closure of the second switch by reason of change in temperature at said controller in said first direction, for changing the effect of said auxiliary temperature changer and maintaining energization of said main temperature changing device upon opening of said second switch while said first switch remains closed due to change in temperature at said controller in said second direction, and for changing the effect of said auxiliary temperature changer back to its original condition and deenergizing said main temperature changing device upon opening of said first switch due to further change in temperature at said controller in said second direction.

16. A heating system, comprising, in combination, an electrically controlled main heat supplying device, a single gradual acting temperature responsive element responsive to the temperature produced by said device, first and second switches operated thereby at different temperatures which do not overlap, circuit connections by which the first of said switches controls said heat supplying device to increase the supply of heat and the second thereof controls said device to decrease the supply of heat, an auxiliary electrical heater for locally heating said element, and means including circuit connections for energizing said auxiliary electrical heater while said main heat supplying device is supplying heat but only after movement of said first switch out of that position which initially caused operation of said main heat supplying device to supply increased heat.

17. A temperature changing system, comprising, in combination, an electrically operated temperature changing device for changing the temperature of a space while energized, a single space temperature responsive element, first and second switches sequentially closed thereby at different temperatures upon temperature change in a first direction and opened in reverse order upon temperature change in a second direction, means including circuit connections for energizing said temperature changing device upon closure of said second switch upon temperature change in said first direction and for maintaining energization thereof upon opening of said second switch and until said first switch opens upon temperature change in the second direction, an electrical heater for locally heating said single space temperature responsive element, and means including circuit connections to change the current flow therethrough in one manner upon opening of said second switch while said main temperature changing device is in operation and in an opposite manner upon opening of said first switch by reason of further temperature change in the same direction that caused opening of said second switch.

18. In combination, a temperature responsive device, control means movable from a first position to a second position, there being an intermediate position between said first and second positions, a temperature changing device, means associated with said control means to place said temperature changing device in operation when the control means moves to its second position and to maintain the same in operation when the control means returns through the intermediate position and until the same reaches its first position, an auxiliary temperature changing device for locally affecting the control means, and connections for permitting operation of said auxiliary temperature changing device only after the control means moves from its second position to its intermediate position and to maintain the auxiliary temperature changing device in operation until said control means reaches its first position.

19. In a temperature control system, in combination, an electric device in control of the temperature, a maintaining switch closed upon energization of the electric device, a first temperature controlled switch, means for completing a circuit through the first temperature controlled switch and the electric device for energizing the same, a second temperature controlled switch, means for completing a circuit through the second temperature controlled switch, the maintaining switch and the electric device independent of the first temperature controlled switch for maintaining the device in operation after opening of the first temperature controlled switch, and means for supplying auxiliary heat to the second temperature controlled switch to hasten its action, said last mentioned means being rendered operative upon opening of the first temperature controlled switch.

20. In a condition controlling system, in combination, an electric device for changing the condition, a maintaining switch closed upon energization of the electric device, a first condition controlled switch, means for completing a circuit through the first condition controlled switch and the electric device for energizing the same, a second condition controlled switch, means for completing a circuit through the second condition controlled switch, the maintaining switch and the electric device independent of the first condition controlled switch for maintaining the device in operation after opening of the first condition controlled switch, and auxiliary means for changing the response of the second condition controlled switch, said last mentioned means being rendered operative upon opening of the first condition controlled switch.

21. Temperature changing means for changing a temperature condition, control means movable between first and second positions, means responsive to the temperature of the condition being controlled for gradually moving the control means between the two positions, means controlled by the control means to place the temperature changing means in operation when the control means is moved to the first position, means controlled by the control means to maintain the temperature changing means in operation while the control means is being moved from such first position to the second position, and means rendered operative when the control means has moved away from the first position to hasten the movement of the control means from the first position to the second position.

22. Temperature changing means for changing a temperature condition, control means movable between first and second positions, means responsive to the temperature of the condition being controlled for gradually moving the control means between the two positions, means controlled by the control means to place the temperature changing means in operation when the control means is moved to the first position, means controlled by the control means to maintain the temperature changing means in operation while the control means is being moved from such first position to the second position, and means operative during operation of the temperature changing means but only after the control means has moved away from the first position to hasten movement of the control means from the first position to the second position.

PAUL F. SHIVERS.